INVENTOR.
BALTHASAR H. PINCKAERS
BY
Omund R. Dahle
ATTORNEY

Patented Apr. 11, 1967

3,313,997
TRIGGERING CIRCUIT FOR CONTROLLED RECTIFIER SYSTEM
Balthasar H. Pinckaers, Edina, Minn., assignor to Honeywell Inc., a corporation of Delaware
Filed Apr. 24, 1964, Ser. No. 362,275
6 Claims. (Cl. 321—18)

This invention relates generally to the field of semiconductor control circuits and, more specifically, to new and improved triggering circuits for use in controlled rectifier systems. This invention discloses apparatus for converting a slowly increasing A.C. input voltage into a step D.C. output voltage. The apparatus also includes an electronic differential which is activated immediately upon the step D.C. output having been realized.

It is an object of this invention to provide a new and improved triggering circuit for a controlled rectifier switching apparatus.

It is a more specific object of this invention to provide an improved circuit for converting a slowly increasing A.C. input voltage into a step D.C. output voltage in a controlled rectifier apparatus which includes an electronic differential circuit.

These and other objects of the invention will become more apparent upon a consideration of the specification, claims and drawings of which:

Figure 1:
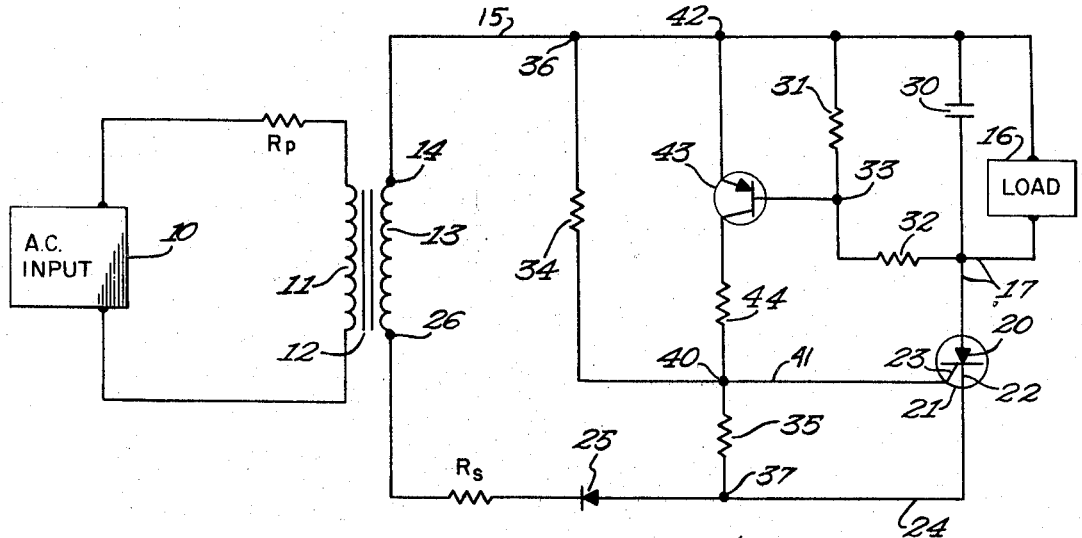
FIGURE 1 is a schematic representation of a half-wave embodiment of the invention.

Referring now to FIGURE 1, there is disclosed a source of A.C. input voltage 10. This input may be a slowly varying voltage and may, for example, be a slowly increasing A.C. potential. The A.C. input 10 is shown as being connected to energize a winding 11 of a transformer 12. A small resistance $R_p$ is shown in series with the primary winding 11 and represents the winding resistance of the primary. Transformer 12 also includes a secondary winding 13 which has in series therewith a resistance $R_s$ which is intended to represent the winding resistance of the secondary winding. An upper terminal 14 of the secondary winding 13 is connected through a conductor 15 to one terminal of a load 16. This load 16 may be any conventional load, such as the input to further switching control apparatus, or may in its simplest form be a resistive type load. The other terminal of the load 16 is connected by a conductor 17 to an anode 20 of a controlled rectifier 21. The controlled rectifier is here shown as a SCR and also includes a cathode 22 and a gate or control electrode 23. The cathode 22 is connected by means of a conductor 24 and a rectifying diode 25 to a terminal 26 which is the other terminal of secondary winding 13.

A relatively large capacitor 30 is connected in parallel with the load 16. Also connected in parallel with the load 16 is a voltage divider comprising series connected resistors 31 and 32 and having a junction 33 between the two resistors.

A second voltage divider is connected across the A.C. input and comprises a pair of resistors 34 and 35 which are connected from a junction 36 on the conductor 15 to a junction 37 on the conductor 24. Between the two series connected resistors 34 and 35 is a junction 40 which is directly connected by a conductor 41 to the control electrode 23 of the SCR 21.

A variable impedance circuit is connected in parallel with the resistor 34 and this circuit may be traced from a junction 42 on the conductor 15 through the emitter-collector circuit of a transistor 43, and through a resistor 44 to the junction 40. The base electrode of the transistor 43 is directly connected to the junction 33.

In considering the operation of the circuit of FIGURE 1, it will be noted that rectifier 25 allows half-wave pulses of current to flow in the above described circuit. Let us assume initial conditions in which the A.C. input voltage is relatively low. Under these conditions a current path may be traced from the upper terminal 14 of the secondary winding 13 through the conductor 15, junction 36, resistor 34, junction 40, resistor 35, junction 37 and rectifier 25 back to the lower terminal 26 of the secondary winding. The voltage divider comprising resistors 34 and 35 is normally designed such that resistor 35 is a relatively low value of resistance as compared with resistor 34 so that the majority of the voltage appears across resistor 34 and only a fraction of a volt appears across resistor 35. The voltage appearing across resistor 35 is the potential which appears between the gate electrode 23 and cathode 22 of the SCR 21. When the A.C. input voltage has increased to the magnitude at which it is desired that the SCR will be triggered to its "on" condition, as determined by the relative values of resistors 34 and 35, the potential appearing at gate 23 will be sufficiently positive with respect to cathode 22 to render SCR conductive. A further current path may now be traced from terminal 14 through the load 16, the SCR 21, conductor 24 and rectifier 25 to the lower terminal 26 of the secondary winding 13. In addition to the current flowing in load device 16, the capacitor 30 commences to charge and current also flows through the voltage divider comprising resistors 31 and 32.

It is desired that this circuit have a differential so that once the circuit has made a decision to turn on during one half cycle of the A.C. input it will continue to make the same turn-on decision for each succeeding positive half cycle as long as the input voltage remains at that level of magnitude. This differential generating network comprises the resistors 31 and 32, the transistor 43 and the resistor 44. As was described above, when the SCR 21 becomes conductive, the capacitor 30 commences to charge and current also flows through the resistors 31 and 32. The voltage drop across the resistor 31 is also applied to the emitter-base circuit of transistor 43 to render it conductive. When transistor 43 is conductive the resistor 44 is effectively in parallel with resistor 34 thereby changing the ratio of the voltage divider to increase the potential seen across resistor 35. The time constants designed into the circuit are such that the potential on capacitor 30 carries over from one cycle to the next sufficiently to maintain transistor 43 conductive when the SCR has fired on the previous cycle. The desired turn on-turn off differential can be controlled by proper design of the magnitude of resistor 44.

Figure 2:
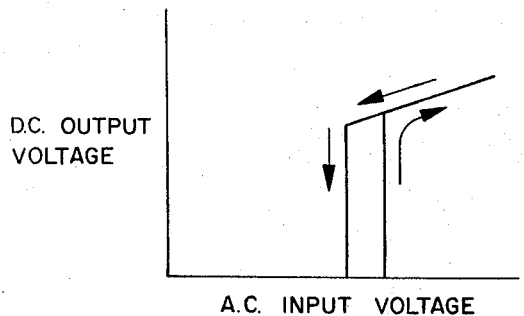
FIGURE 2 is a graphical representation of the voltage wave forms which further describe the operating characteristics of the apparatus of FIGURE 1; and, FIGURE 3 is a schematic representation of a full-wave embodiment of the invention.

FIGURE 2 is a graphical representation which shows the D.C. step output voltage obtained as plotted against the A.C. input voltage.

Figure 3:
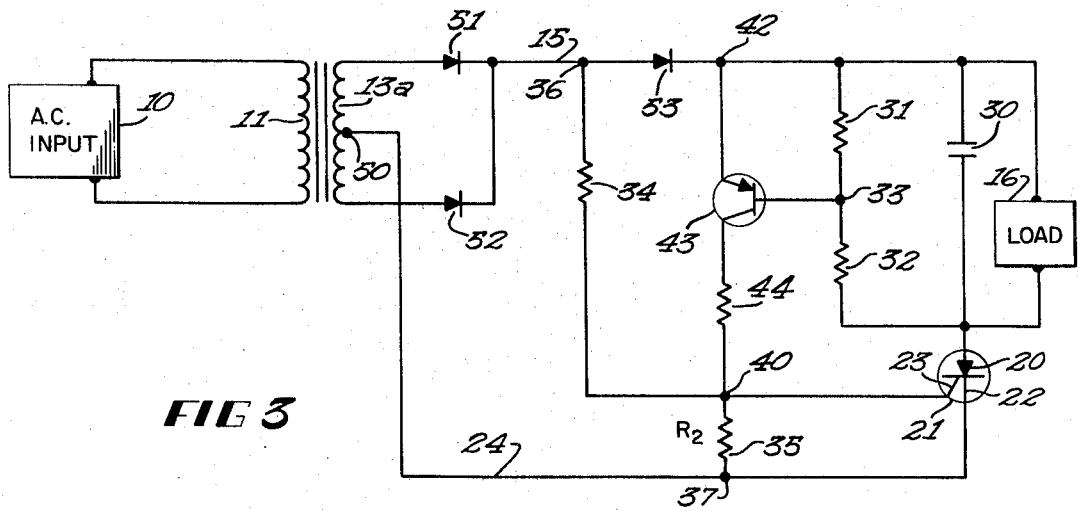

Turning now to FIGURE 3, it can be seen that in many respects the circuit is similar to FIGURE 1 except that it is adapted for full-wave operation in FIGURE 2 as compared with half-wave operation in FIGURE 1. The secondary winding 13a has a center tap connection 50 which is connected to the negative conductor 24. A pair of rectifiers 51 and 52 connect the upper and lower terminals of the secondary winding 13a to the positive conductor 15 to provide full-wave rectified pulses. The voltage divider comprising resistors 34 and 35 remains unchanged from that discussed above. Between junction 36 and junction 42 on the conductor 15 a rectifying diode 53 is connected with the direction of easy current flow in the diode being towards junction 42. The diode 53 prevents the voltage charge on capacitor 30 from causing any reverse current flow in that portion of the circuit. In other respects the operation of the circuit of FIGURE 3 is substantially the same as described above for FIGURE 1. The time constant values involved in the differential producing circuit need not necessarily be as long as in the circuit shown in FIGURE 3 because the SCR is being caused to fire every half cycle rather than once every cycle as in FIGURE 1.

Modifications of this invention may be readily apparent to those who are skilled in the art and I therefore wish it is to be understood I intend to be limited by the scope of the appended claims and not by the specific embodiment disclosed for the purpose of illustration only.

I claim:

1. Semiconductor controlled rectifier triggering apparatus for converting a slowly changing alternating current signal voltage into a step type direct current output voltage comprising:
   variable magnitude alternating current signal source means having first and second output terminals;
   normally nonconductive semiconductor controlled rectifier means having a plurality of electrodes including an anode, a cathode and a control electrode;
   conductive current path means comprising serially connected rectifying means, the anode-cathode circuit of said controlled rectifier means and load means energized from said first and second output terminals;
   voltage divider network means including a variable impedance portion, the opposite terminals of said voltage divider network being connected to said first and second output terminals, said voltage divider means having an intermediate terminal connected to said control electrode to provide a first predetermined portion of said signal voltage to said control electrode so that upon said signal voltage reaching a desired magnitude said controlled rectifier means is rendered conductive;
   and further circuit means responsive to the energization of said load means resulting from the conduction of said controlled rectifier means connected in controlling relation to said variable impedance portion to modify said voltage divider network and change to a second predetermined portion the voltage existing at said intermediate terminal such that the voltage applied to said control electrode for a given magnitude of signal voltage is increased after said control rectifier means has been rendered conductive thereby providing a turn on-turn off differential for said controlled rectifier triggering apparatus.

2. Semiconductor controlled rectifier triggering apparatus for converting a slowly changing alternating current signal voltage into a step type direct current output voltage comprising:
   variable magnitude alternating current signal source means having first and second output terminals;
   semiconductor controlled rectifier means having a plurality of electrodes including an anode, a cathode and a gate electrode;
   conductive current path means energized from said first and second output terminals and comprising serially connected load means and the anode-cathode circuit of said controlled rectifier means;
   voltage divider network means including a variable impedance portion said portion comprising a transistor having a plurality of electrodes including a control electrode, the terminals of said voltage divider network being connected to said output terminals, said voltage divider means also having an intermediate terminal connected to said gate electrode to provide a first predetermined portion of said signal voltage to said gate electrode;
   and further circuit means responsive to the energization of said load means connected in controlling relation to said transistor control electrode to modify the impedance of said voltage divider network and change to a second predetermined portion the voltage appearing at said intermediate terminal such that the voltage applied to said gate electrode is increased after said control rectifier means has been rendered conductive thereby providing a turn on-turn off differential for said controlled rectifier triggering apparatus.

3. Semiconductor controlled rectifier triggering apparatus for converting a slowly changing alternating current signal voltage into a step type direct current output voltage comprising:
   variable magnitude alternating current signal source means having first and second output terminals;
   semiconductor controlled rectifier means having a plurality of electrodes including an anode, a cathode and a control electrode;
   conductive current path means serially connected and including rectifier means, the anode-cathode circuit of said controlled rectifier means and load means energized from said first and second output terminals;
   voltage divider network means including a variable impedance portion, the terminals of said voltage divider network being connected to said output terminals, said voltage divider means also having an intermediate terminal connected to said control electrode to provide a first predetermined portion of said signal voltage to said control electrode;
   and further circuit means responsive to the energization of said load means connected in controlling relation to said variable impedance portion to modify said voltage divider network and increase to a second value said voltage portion existing at said intermediate terminal such that the voltage to said control electrode is increased after said control rectifier means has been rendered conductive thereby providing a turn on-turn off differential for said controlled rectifier triggering apparatus.

4. Controlled rectifier triggering apparatus for converting a signal voltage of varying magnitude into a step type output voltage as the signal voltage reaches a predetermined magnitude comprising:
   variable magnitude signal source means having first and second output terminals;
   controlled rectifier means having a plurality of electrodes including an anode, a cathode and a control electrode, said controlled rectifier means being connected to be normally nonconductive;
   load current path means including unidirectional current conducting means and load means connecting said output terminals across said anode-cathode electrodes;
   voltage divider means, including a variable impedance portion, having terminals connected to said output terminals and having an intermediate terminal connected to said control electrode, said intermediate terminal being so located on said voltage divider means that upon the event of said signal voltage reaching a first predetermined magnitude the voltage at said intermediate terminal and said control electrode is sufficient to render conductive said normally nonconductive controlled rectifier means to thereby energize said load means;
   and circuit means responsive to the energization of said load means and connected in controlling relation to said variable impedance portion to effectively modify said voltage divider means upon said load means being energized in a direction such that the voltage to said control electrode is increased whereby said controlled rectifier means will continue to be rendered conductive until said signal voltage falls to a lesser predetermined magnitude.

5. Controlled rectifier triggering apparatus for converting a slowly changing signal voltage into a step output voltage comprising:

variable magnitude signal source means having first and second output terminals;

controlled rectifier means having a plurality of electrodes including a pair of current carrying electrodes and a control electrode;

conductive circuit means including load means connecting said output terminals across said current carrying electrodes;

voltage divider means, including a variable impedance portion comprising a transistor, said means having terminals connected to said output terminals and having an intermediate terminal connected to said control electrode, said intermediate terminal being so located on said voltage divider means that upon the event of said signal voltage reaching a first predetermined magnitude the voltage at said intermediate terminal and said control electrode is sufficient to render conductive said controlled rectifier means to thereby energize said load means;

and circuit means responsive to the energization of said load means and connected in controlling relation to said transistor to change the impedance thereof and effectively modify said voltage divider means upon said load means being energized, said voltage divider means being modified in a direction such that the voltage to said control electrode is increased for a given value of signal voltage whereby said controlled rectifier means will continue to be rendered conductive until said signal voltage falls to a lesser predetermined magnitude.

6. Controlled rectifier triggering apparatus for converting a slowly changing signal voltage into a step output voltage comprising:

variable magnitude signal source means having first and second output terminals;

controlled rectifier means having a plurality of electrodes including a pair of current carrying electrodes and a control electrode;

conductive circuit means including unidirectional current conducting means and load means connecting said output terminals across said current carrying electrodes;

conductive impedance means, including a variable impedance portion, having terminals connected to said output terminals and having an intermediate terminal connected to said control electrode, said intermediate terminal being so located on said impedance means that upon the event of said signal voltage reaching a predetermined magnitude the potential at said intermediate terminal and therefore at said control electrode is sufficient to render conductive said controlled rectifier means to thereby energize said load means;

and circuit means responsive to the energization of said load means and connected in controlling relation to said variable impedance portion and effective upon said load means being energized to modify said conductive impedance means in a direction such that the voltage to said control electrode is increased whereby said controlled rectifier means will continue to be rendered conductive until said signal voltage falls to a lesser predetermined magnitude.

No references cited.

JOHN F. COUCH, *Primary Examiner.*

M. WACHTELL, *Assistant Examiner.*